(12) United States Patent
Heaton

(10) Patent No.: US 9,875,507 B2
(45) Date of Patent: *Jan. 23, 2018

(54) GRAPHICAL ORDER ENTRY USER INTERFACE FOR TRADING SYSTEM

(71) Applicant: BGC PARTNERS, INC., New York, NY (US)

(72) Inventor: Timothy H. Heaton, Morristown, NJ (US)

(73) Assignee: CHART TRADING DEVELOPMENT, LLC, Tyler, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/768,466

(22) Filed: Feb. 15, 2013

(65) Prior Publication Data

US 2014/0006245 A1    Jan. 2, 2014

Related U.S. Application Data

(63) Continuation of application No. 12/756,489, filed on Apr. 8, 2010, now Pat. No. 8,380,611, which is a continuation of application No. 11/465,060, filed on Aug. 16, 2006, now Pat. No. 7,696,997, which is a continuation of application No. 10/306,996, filed on Nov. 27, 2002, now Pat. No. 7,113,190.

(51) Int. Cl.
*G06Q 40/00*  (2012.01)
*G06Q 40/04*  (2012.01)

(52) U.S. Cl.
CPC .................. *G06Q 40/04* (2013.01)

(58) Field of Classification Search
CPC ........ G06Q 10/00; G06Q 20/00; G06Q 30/00; G06Q 40/00
USPC ........................................ 705/3–44
See application file for complete search history.

(56) References Cited

U.S. PATENT DOCUMENTS

| | | | |
|---|---|---|---|
| 5,313,560 A |   | 5/1994 | Maruoka et al. |
| 5,325,481 A | * | 6/1994 | Hunt ............................. 715/809 |
| 5,339,392 A | * | 8/1994 | Risberg et al. ............... 715/762 |
| 5,689,651 A | * | 11/1997 | Lozman ......................... 705/37 |

(Continued)

FOREIGN PATENT DOCUMENTS

| | | |
|---|---|---|
| EP | 0388162 A2 | 9/1990 |
| WO | WO 01/16852 | 3/2001 |

(Continued)

OTHER PUBLICATIONS

UK Shares, from the Internet at http://focus.comdirect.co.uk/en/quick/indicies.html, printed on Jan. 28, 2004, dated by http://www.archive.org to Oct. 3, 2002.

(Continued)

*Primary Examiner* — Frantzy Poinvil

(57) ABSTRACT

On a display terminal of an electronic trading system, a graph is displayed having a first axis and a second axis, wherein the graph includes a curve corresponding to a range of values of a financial instrument. A user is allowed to select a portion of the graph. In response to the user selection of the portion of the graph, a trading dialog box is displayed on the display of the workstation, the dialog box being automatically populated with values for trading, the values based on the values of the selected portion of the graph.

25 Claims, 11 Drawing Sheets

(56) References Cited

U.S. PATENT DOCUMENTS

| | | | |
|---|---|---|---|
| 5,797,002 | A | 8/1998 | Patterson |
| 5,809,483 | A * | 9/1998 | Broka et al. .................... 705/37 |
| 6,014,643 | A * | 1/2000 | Minton ....................... 705/36 R |
| 6,088,029 | A | 7/2000 | Guiberson et al. |
| 6,262,728 | B1 | 7/2001 | Alexander |
| 6,326,092 | B1 * | 12/2001 | Ikarashi et al. ............... 428/811 |
| 6,418,419 | B1 | 7/2002 | Nieboer et al. |
| 6,473,744 | B1 * | 10/2002 | Tuck et al. .................... 705/412 |
| 6,704,015 | B1 | 3/2004 | Bovarnick et al. |
| 6,832,210 | B1 | 12/2004 | Li |
| 6,901,383 | B1 | 5/2005 | Ricketts et al. |
| 6,906,717 | B2 * | 6/2005 | Couckuyt et al. ........... 345/440 |
| 6,958,754 | B2 | 10/2005 | Alexander et al. |
| 6,972,761 | B1 | 12/2005 | Cox et al. |
| 7,000,181 | B2 | 2/2006 | Press |
| 7,113,190 | B2 | 9/2006 | Heaton |
| 7,146,336 | B2 | 12/2006 | Olsen et al. |
| 7,212,999 | B2 | 5/2007 | Friesen et |
| 7,680,715 | B2 | 3/2010 | Waelbroeck et al. |
| 7,696,997 | B2 * | 4/2010 | Heaton ......................... 345/440 |
| 7,882,013 | B2 * | 2/2011 | Shapiro et al. ................. 705/37 |
| 7,890,416 | B2 | 2/2011 | Kirwin et al. |
| 8,041,626 | B2 | 10/2011 | Kirwin et al. |
| 8,055,574 | B2 * | 11/2011 | Cutler et al. .................... 705/37 |
| 8,060,435 | B2 | 11/2011 | Kirwin et al. |
| 8,380,611 | B2 | 2/2013 | Heaton |
| 9,175,978 | B2 | 11/2015 | Hall |
| 9,412,349 | B2 | 8/2016 | Little et al. |
| 2001/0000964 | A1 | 5/2001 | Alexander |
| 2001/0049651 | A1 | 12/2001 | Selleck |
| 2002/0004774 | A1 | 1/2002 | DeFarlo |
| 2002/0026404 | A1 | 2/2002 | Thompson |
| 2002/0030683 | A1 | 3/2002 | Alexander |
| 2002/0063733 | A1 * | 5/2002 | Franke et al. ................. 345/739 |
| 2002/0067358 | A1 * | 6/2002 | Casari et al. ................. 345/440 |
| 2002/0120551 | A1 * | 8/2002 | Jones, III ........................ 705/37 |
| 2003/0009411 | A1 * | 1/2003 | Ram et al. ....................... 705/37 |
| 2003/0061148 | A1 | 3/2003 | Alavian |
| 2003/0110120 | A1 | 6/2003 | Salehi |
| 2004/0027349 | A1 | 2/2004 | Landau et al. |
| 2005/0075966 | A1 | 4/2005 | Duka |
| 2008/0183639 | A1 * | 7/2008 | DiSalvo ...................... 705/36 R |
| 2010/0153304 | A1 * | 6/2010 | Waelbroeck et al. ........ 705/36 R |
| 2011/0029423 | A1 * | 2/2011 | Cutler et al. .................... 705/37 |
| 2011/0251940 | A1 * | 10/2011 | Heaton ........................... 705/37 |

FOREIGN PATENT DOCUMENTS

| | | |
|---|---|---|
| WO | WO 01/46841 | 6/2001 |
| WO | WO 01/75733 | 10/2001 |
| WO | WO 01/82149 | 11/2001 |

OTHER PUBLICATIONS

PSION: Investor relations Share Price & graph, from the Internet at http://ww6.investorrelations.co.uk/psion/UpdateSharePrice.shtml, printed on Jan. 27, 2004.

TDG Share Price Graph: TDG Investor Information, from the Internet at http://www.tdg.co.uk/shareprice_graph.asp, printed on Jan. 28, 2004.

Intraday Chart, from the Internet at http://finance.yahoo.com, printed on Feb. 7, 2003.

Intraday Chart, from the Internet at http://quote.bloomberg,com, printed on Feb. 7, 2003.

Definition of "interface," Microsoft Computer Dictionary 241 (4th ed. 1999).

Definition of "interactive," The Computer Desktop Encyclopedia 457 (2d ed. 1999).

Definition of "graphical user interface," Microsoft Computer Dictionary 207 (4th ed. 1999).

Definition of "computer," Microsoft Computer Dictionary 102 (4th ed. 1999).

Definition of "interactive," Microsoft Computer Dictionary 240 (4th ed. 1999).

Definition of "interface," The Computer Desktop Encyclopedia 458 (2d ed. 1999).

Definition of "command-line interface," Microsoft Computer Dictionary 96 (4th ed. 1999).

Definition of "interactive," Microsoft Computer Dictionary. 279 (5th ed. 2002).

Definition of "dialog box," Microsoft Computer Dictionary 156 (5th ed. 2002).

Definition of "select," Merriam-Webster's Collegiate Dictionary 1056 (10th ed. 2001).

Gorham et al., "Electronic Exchanges: The Global Transformation from Pits to Bits" (excerpts) Elsevier, Amsterdam (2009).

Reimer, J., "A History of the GUI," Arstechnica.com (May 5, 2005).

Myers, B. "A Brief History of Human-Computer Interaction Technology," *Interactions Magazine*, 5(2) 44-54 (Mar./Apr. 1998).

Web Archives, "Executing Trades Has Never Been Easier," available at https://web.archive.org/web/20160420231421/http://www.cqg.com/solutions/electronictrading/trading-interfaces (last visited Dec. 5, 2016).

CQG, "Revolutionize Your Trading with Our Market Profile® Chart and Studies," available at http://www.cqg.com/solutions/analytics/market-profile (last visited Dec. 5, 2016).

Web Archives, "Revolutionize Your Trading with Our Market Profile® Chart and Studies," available at https://web.archive.org/web/20150703190024/http:/www.cqg.com/solutions/analytics/features/market-profile (last visited Dec. 5, 2016).

CQG, "CQG Launches New Charting and Trade Execution Software," available at http://news.cqg.com/news/press-releases/2013/11/cqg-launches-new-charting-and-trade-execution-software (last visited Dec. 5, 2016).

Interactive Brokers, "Optimize your trading speed and efficiency with IB Trader Workstation," available at https://www.interactivebrokers.com/en/index.php?f=14099&ns=T (last visited Dec. 5, 2016).

Ninja Trader, "NinjaTrader® 6 Released with High-Performance System Development Capabilities," www.ninjatrader.com (Apr. 24, 2007).

Ninja Trader, "Trade Directly from Your Charts—Chart Trader!," available at http://ninjatrader.com/blog/trade-directly-charts-chart-trader/ (last visited Dec. 5, 2016).

NinjaTrader, Chart: the world's leading Futures, Forex and Stock markets, available at http://ninjatrader.com/Analyze (last visited Dec. 5, 2016).

TradeStation, TradeStation Platform, available at https://www.tradestation.com/trading-technology/tradestation-platform/execute/chart-trading (last visited Dec. 5, 2016).

TradeStation, "What's New in TradeStation 9.1—Update 4," available at https://www.tradestation.com/trading-technology/whats-new/tradestation-9-1/update-4 (last visited Dec. 5, 2016).

TradeStation, "Stay Connected with WEB TRADING," available at https:l/www.tradestation.com/trading-technology/tradestation-webtrading (last visited Dec. 5, 2016).

Velez. O et al., "Tools and Tactics for the Master Day Trader: Battle-Tested Techniques for Day, Swing, and Position Traders," 293-299 McGraw-Hill, New York (2000).

CME Group, "About CME Group," http://www.cmegroup.com/company/ (last visited Feb. 8, 2016).

CME Group, "CME Group Overview," http://www.cmegroup.com/company/files/cmegroup-overview.pdf (last visited Feb. 8, 2016).

Petram, L.O., "The World's First Stock Exchange: How The Amsterdam Market For Dutch East India Company Shares Became A Modern Securities Market, 1602-1700," Introduction (2011) (Ph.D. Thesis, Instituut voor Cultuur en Geschiedenis) http://dare.uva.nl/document/2/85961.

Powers, Mark J., "Starting Out in Futures Trading," 324-325, McGraw-Hill, New York ($6^{th}$ ed. 2001).

Parikh, S. et al., "Electronic futures markets versus floor trading: Implications for interface design," Paper presented at the Chi '95 Proceedings of the Sigchi Conference on Human Factors in Computing Systems, 296-303 (1995).

(56) References Cited

OTHER PUBLICATIONS

Klein, A., "Wallstreet.com: Fat Cat Investing At the Click of a Mouse; How Andy Klein and the Internet Can Give Everyone a Seat on the Exchange," 151-154 Henry Holt and Co., Inc. New York (1998).

Nye, A. (ed.). "The Definitive Guides to the X Window System, vol. Two, Xlib Reference Manual For Version 114," 538-539 O'Reilly & Associates, Inc. 6th printing, 1990.

Nison, S., "Japanese Candlestick Charting Techniques: A Contemporary Guide to the Ancient Investment Techniques of the Far East," New York Institute of Finance, New York (2nd ed. 2001).

Murphy, J., "Technical Analysis of the Financial Markets: A Comprehensive Guide to Trading Methods and Applications," New York Institute of Finance, New York (1999).

Hoyle, "The Game in Wall Street, and How to Play it Successfully," J.S. Ogilvie Publishing Co., New York, (1898).

Rudd, B. "Stock Patterns for Day Trading," Traders Press, Inc., Greenville, SC 2000 reprint (1998).

Oz, T., "Stock Trading Wizard: Advanced Short-Term Trading Strategies for Swing and Day Trading," Tony Oz Publications, Laguna Hills, CA (1999).

Wright. W., "Research Report: Information Animation Applications in the Capital Markets," in Readings in Information Visualization: Using Vision to Think, (Stuart K. Card et al. eds.) 83, Morgan Kaufmann Publishers, Inc. (Stuart K. Card et al. eds.), San Francisco, 1999.

Robards, T., "Private Network is Established for Trading Institutional Stock," N.Y. Times, Mar. 6, 1969 at 57.

Thorp, W.A. "Technical Analysis Software," *Computerized Investing*, May/Jun. 2000 at 8.

Institution Decision, *Interactive Brokers LLC et al., v. -Chart Trading Development, LLC*, CBM2016-00039 (Aug. 23, 2016).

Institution Decision, *Interactive Brokers LLC et al., v. Chart Trading Development, LLC*, CBM2016-00038 (Aug. 23, 2016).

Institution Decision, *CQG, Inc., et al., v. Chart Trading Development, LLC*, CBM2016-00047 (Sep. 9, 2016).

Institution Decision, *CQG, Inc., et al., v. Chart Trading Development, LLC*, CBM2016-00048 (Sep. 12, 2016).

Institution Decision, *CQG, Inc., et al., v. Chart Trading Development, LLC*, CBM2016-00046 (Sep. 13, 2016).

Final Written Decision, *Interactive Brokers LLC et al., v. Chart Trading Development, LLC*, CBM2016-00038 (Aug. 18, 2017).

Final Written Decision, *Interactive Brokers LLC et al., v. Chart Trading Development, LLC*, CBM2016-00039 (Aug. 18, 2017).

Final Written Decision, *CQG, Inc., et al. v. Chart Trading Development, LLC*, CBM2016-00046 (Sep. 1, 2017).

Final Written Decision, *CQG, Inc., et al. v. Chart Trading Development, LLC*, CBM2016-00047 (Sep. 1, 2017).

Final Written Decision, *CQG, Inc., et al. v. Chart Trading Development, LLC*, CBM2016-00048 (Sep. 1, 2017).

\* cited by examiner

GRAPHICAL ORDER ENTRY USER INTERFACE FOR TRADING SYSTEM

This application is a continuation of U.S. application Ser. No. 12/756,489 filed Apr. 8, 2010, issued as U.S. Pat. No. 8,380,611 on Feb. 19, 2013, which is a continuation of application Ser. No. 11/465,060 filed Aug. 16, 2006, issued as U.S. Pat. No. 7,696,997 on Apr. 13, 2010, which is a continuation of application Ser. No. 10/306,996, filed Nov. 27, 2002, issued as U.S. Pat. No. 7,113,190 on Sep. 26, 2006, titled "Systems and methods for providing an interactive graphical representation of a market for an electronic trading system," all of which are incorporated by reference.

BACKGROUND

This application relates to the trading or exchange of securities or commodities within an organized system.

Electronically-based trading systems have gained widespread popularity over the years. Such trading systems are frequently used for trading items ranging from financial instruments (such as stocks, bonds, currency, futures contracts, etc.) to used household goods (such as old records, baseball cards, antiques, etc.). In many of these trading systems, bid/offer-hit/lift processes are used to negotiate a sale of a given item. In connection with such processes, bids and/or offers for items are entered into an electronic trading system, and a hit or lift is submitted in response to a bid or offer, respectively, to agree to a sale or purchase.

Currently, prior to entering a bid or offer into an electronic trading system or submitting a hit or lift in response to a specific bid or offer, traders can review trading-related information in a tabular format. For example, the trader can access a table that includes a list of financial instruments and corresponding bids and offers for each of the instruments. Based on the information provided to the trader in the table, the trader can determine, for example, what bids or offers to enter into the electronic trading system or which existing bids and offers are desirable to hit or lift. However, these determinations can be difficult due to the overwhelming amount of information provided to the trader in the table.

Currently, traders can also access graphical representations of financial markets to gain an overall understanding of a market's activity. Graphs, in contrast to tables of financial information, make it easier for the trader to determine market trends. However, these graphs are not interactive, as the trader is only provided with a representation of the current activity of a market and is not able to enter a bid or offer or submit a hit or lift directly from the graph.

SUMMARY

In general, in a first aspect, the invention features methods and apparatus for providing an interactive graphical representation of a market. The apparatus has a server storage device and a server processor connected to the server storage device, the server storage device storing a server program for controlling the server processor. The server processor is operative with the server program to (a) display a graph having a first axis and a second axis on a display of a workstation, wherein the graph includes a curve corresponding to a range of values of a financial instrument; (b) allow a user to select a portion of the graph; and (c) in response to the user selection of the portion of the graph, display a trading dialog box on the display of the workstation.

In general, in a second aspect, the invention features a method and apparatus for providing an interactive graphical representation of a market The apparatus has a server storage device and a server processor connected to the server storage device, the server storage device storing a server program for controlling the server processor. The server processor is operative with the server program to: (a) display a graph having a first axis and a second axis on a display of a workstation, wherein the graph includes (i) a plurality of first symbols, wherein each first symbol of the plurality of first symbols corresponds to a bid for a particular financial instrument; and (ii) a plurality of second symbols, wherein each second symbol of the plurality of second symbols corresponds to an offer for a particular financial instrument; (b) allow a user to select a portion of the graph; and (c) in response to the user selection of the portion of the graph, displaying a trading dialog box on the display of the workstation.

Embodiments of the invention may include one or more of the following features. The first axis may correspond to maturity date. The second axis may correspond to price. The second axis may correspond to yield. The curve may be a fair value curve. The portion of the graph may be located within the confines of the first and second axes. Allowing the user to select a portion of the graph may include allowing the user to select a portion of the curve. The trading dialog box may include information relating to the selected portion of the graph. The server program may be configured to allow the user to select a portion of the curve. The trading dialog box may include information relating to the selected portion of graph. The server program may be configured to allow the user to select a first symbol. Allowing the user to select a portion of the graph may include allowing the user to select a first symbol. The trading dialog box may include information relating to a bid corresponding to the selected first symbol. The server program may be configured to allow the user to select a second symbol. Allowing the user to select a portion of the graph may include allowing the user to select a second symbol. The trading dialog box may includes information relating to an offer corresponding to the selected second symbol. The server program may be configured to allow the user to select both a first symbol and a second symbol. Allowing the user to select a portion of the graph may include allowing the user to select both a first symbol and a second symbol. The trading dialog box may include information relating to a bid corresponding to the selected first symbol and an offer corresponding to the selected second symbol.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

DESCRIPTION

Figure 1:
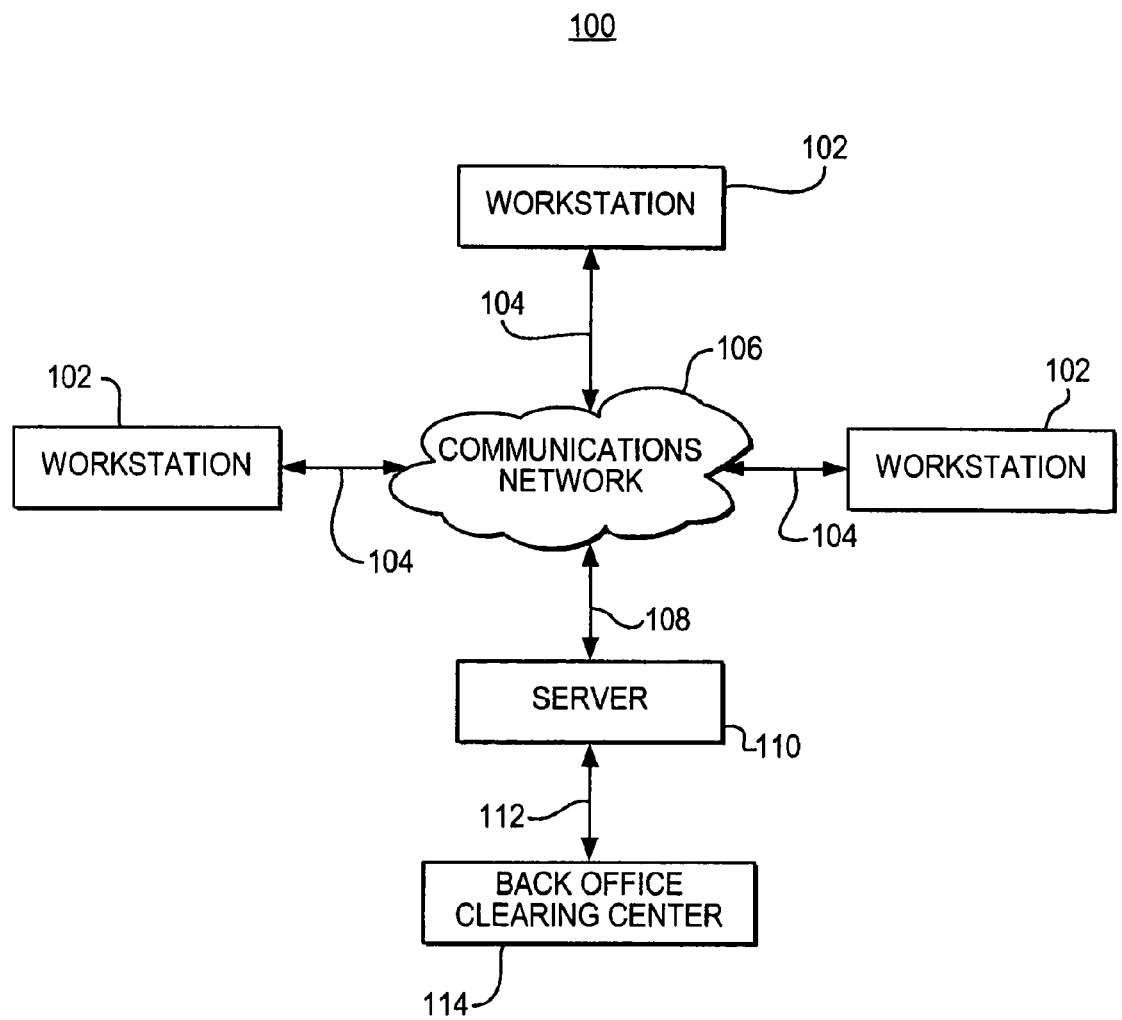
FIG. 1 is a schematic diagram of an illustrative electronic trading system suitable for implementation of a graphical trading interface application.

Referring to FIG. 1, a graphical representation of a market may provide an interactive graphical representation of a market for an electronic trading system that allows a user to, for example, place a trade directly from the graphical representation. The systems and methods may provide an interactive graphical representation of a market for an electronic trading system that allows a user to, for example, place a trade directly from the graphical representation are provided.

A graph having a first axis and a second axis may be displayed on a display of a workstation. In one example, the graph may include a curve corresponding to a range of values of a financial instrument. In another example, the graph may include a plurality of first symbols and a plurality of second symbols. Each first symbol of the plurality of first symbols may correspond to a bid for a financial instrument. Each second symbol of the plurality of second symbols may correspond to an offer for a financial instrument. A user may be allowed to select a portion of the graph. In response to the user selection of the portion of the graph, a trading dialog box may be displayed on the display of the workstation.

Referring to FIG. 1, electronic trading system 100 suitable for implementation of a graphical trading interface application may include one or more workstations 102. Workstations 102 may be local or remote. Workstations 102 are connected by one or more communication links 104 to communications network 106 that is connected via communication link 108 to server 110. Server 110 is connected via communication link 112 to back office clearing center 114.

Server 110 may be any server suitable for providing access to the graphical trading interface application, such as a processor, a computer, a data processing device, or a combination of such devices. In one example, server 110 may be a server powered by eSpeed, Inc. Server 110 and back office clearing center 114 may form part of the electronic trading system. Furthermore, server 110 may contain the graphical trading interface application and merely transmit a graphical user interface (GUI) or other display screens to a user at a user workstation, such as workstation 102.

Communications network 106 may be any suitable communications network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), a public switched telephone network, any other suitable communications network, or a combination of such networks. Communication links 104 and 108 may be any communication links suitable for communicating data between workstations 102 and server 110, such as network links, dial-up links, wireless links, any other suitable communication link, or a combination of such links.

Workstations 102 may include, for example, any suitable personal computer (PC), mainframe computer, dumb terminal, data display, two-way pager, wireless terminal, portable telephone, portable computer (e.g., a notebook computer), palmtop computer, handheld personal computer (H/PC), automobile PC, personal digital assistant (PDA), Internet-enabled cellular phone, combined cellular phone and PDA, any other suitable computing device, or a combination of such devices. Workstations 102 may be used to implement the graphical trading interface application.

Back office clearing center 114 may be any suitable equipment, such as a computer, a laptop computer, a mainframe computer, any other suitable computing device, or a combination of such computing devices, for causing transactions to be cleared and/or verifying that transactions are cleared. Communication link 112 may be any communication link suitable for communicating data between server 110 and back office clearing center 114, such as a network link, a dial-up link, a wireless link, a hard-wired link, or any other suitable communication link.

Figure 2:
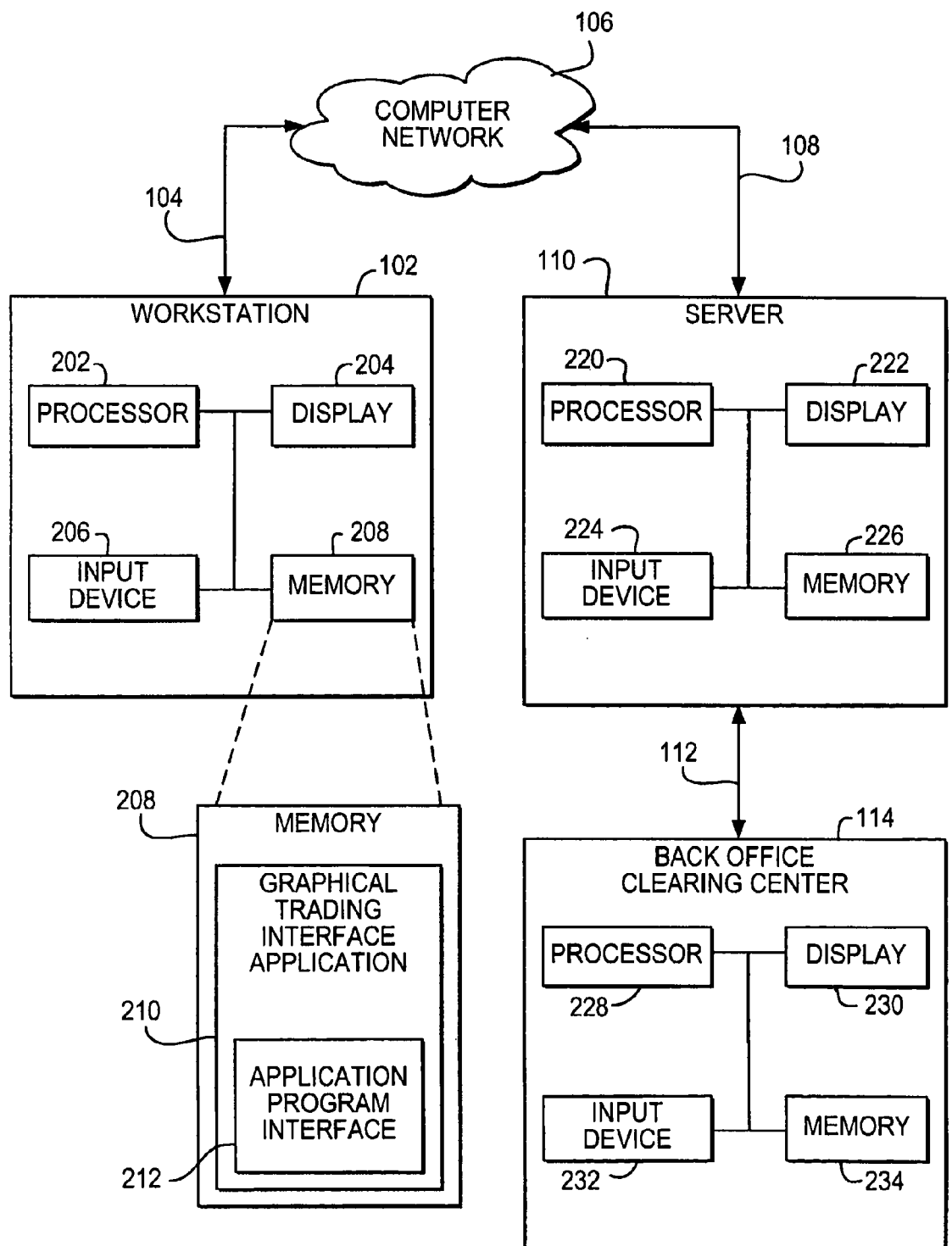
FIG. 2 is a schematic diagram of a workstation, a server, and a back office clearing center that may be used to implement the processes and functions of some embodiments of the present invention.

Server 110, back office clearing center 114, and a workstation 102, which are depicted in FIG. 1, are illustrated in more detail in FIG. 2. Referring to FIG. 2, workstation 102 may include processor 202, display 204, input device 206, and memory 208, which may be interconnected. In a preferred embodiment, memory 208 contains a storage device for storing a workstation program for controlling processor 202. Memory 208 also preferably contains a graphical trading interface application 210.

As shown in FIG. 2, graphical trading interface application 210 may include application program interface 212. Alternatively, as described above, graphical trading interface application 210 may be resident in the memory of server 110. In such embodiments, the electronic trading system may contain graphical trading interface application 210 and application program interface 212 as an application that is discrete from the electronic trading application, which also may be included therein. The only distribution to the user may be a GUI which allows the user to interact with graphical trading interface application 210 resident at server 110.

Processor 202 uses the workstation program to present on display 204, for example, graphical trading interface information received through communication link 104 and trading commands and values transmitted by a trader at workstation 102. Furthermore, input device 206 may be used to manually enter commands and values to be communicated to the electronic trading system.

Server 110 may include processor 220, display 222, input device 224, and memory 226, which may be interconnected. In a preferred embodiment, memory 226 contains a storage device for storing information relating to market conditions received through communication link 108 or through other links, and also receives trading commands and values transmitted by one or more users. The storage device further contains a server program for controlling processor 220. Processor 220 uses the server program to transact the purchase and sale of financial instruments.

Back office clearing center 114 may include processor 228, display 230, input device 232, and memory 234, which may be interconnected. In a preferred embodiment, memory 234 contains a storage device for storing a clearing program for controlling processor 228. Processor 228 may use the clearing program to complete the transactions that are entered into by the users. Processor 228 uses the clearing program to further verify that the transactions are completed and cleared.

The electronic trading application may be any suitable software, hardware, or both configured to implement the features described herein. In one suitable approach, the electronic trading application may be located at a central location (e.g., a central server, such as server 110). In another suitable approach, the electronic trading application may reside among different locations (e.g., a network).

In one particular embodiment, the electronic trading application may include client-side software, hardware, or both. For example, the electronic trading application may encompass one or more Web pages or Web page portions (e.g., via any suitable encoding, such as HyperText Markup Language (HTML), Dynamic HyperText Markup Language (DHTML), Extensible Markup Language (XML), JavaServer Pages (JSP), Active Server Pages (ASP), or any other suitable approaches).

Furthermore, although the electronic trading application is described herein as being implemented on user computer equipment, this is only illustrative. As described hereinabove, the electronic trading application may be implemented on any suitable platform (e.g., PC, mainframe computer, dumb terminal, data display, two-way pager, wireless terminal, portable telephone, portable computer, palmtop computer, H/PC, automobile PC, PDA, Internet-enabled cellular phone, combined cellular phone and PDA, etc.) to provide such features.

Interactive graphical representation of a market for an electronic trading system are provided. As described hereinabove, an individual is better suited to determine a pattern on a graph than in a table of information. Users of the electronic trading system may take advantage of this ability in order to facilitate the trading of financial instruments. Financial instruments may include, for example, fixed income related instruments (e.g., United States Treasuries, United Kingdom Gilts, European Government bonds, and Emerging Market debts, swaps, and repos), securities, stocks, currencies, etc. The examples provided hereinbelow are related to the trading of fixed income related instruments. However, these examples are merely illustrative, and the systems and methods of the present invention may be used in connection with any suitable financial instrument.

Figure 3:
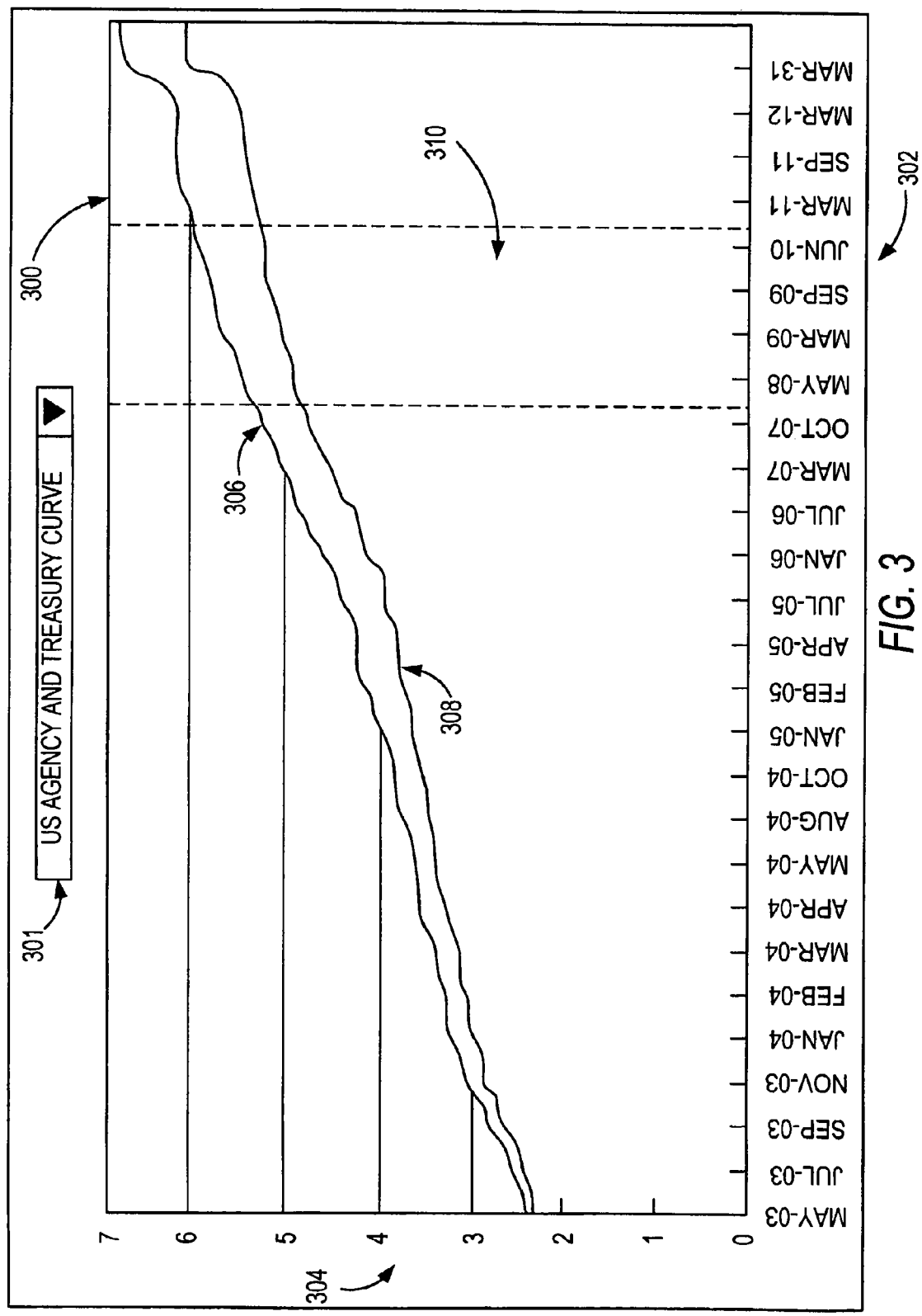
FIG. 3 is a graphical trading interface that may be provided to a user by the graphical trading interface application.

FIG. 3 shows a graphical trading interface that may be provided to a user by the graphical trading interface application. (It should be noted that the terms "user" and "trader," in reference to a participant in an electronic trading system, are used interchangeably herein.) In general, graphical trading interface 300, or simply graph 300, provides a user with a graphical representation of a market. In other words, any financial instrument having two or more related parameters that can be "plotted" on a graph may be provided to the user in graph 300. The financial information used to create graph 300 may be information that is typically stored in a tabular format (e.g., a spreadsheet). In the example shown in FIG. 3, graph 300 includes a "U.S. Agency and Treasury Curve" (as shown in drop-down title box 301). The user may be provided with a number of different graphs from which to choose. For example, the user may select drop-down title box 301 to access a list of possible graphs (not shown). The user may select drop-down title box 301 by using an input device (e.g., input device 206 of FIG. 2) such as a mouse, keyboard, or any other suitable input device.

Graph 300 has a first axis 302 and a second axis 304. As described hereinabove, axes 302 and 304 represent two related parameters in connection with the financial instrument curves shown in graph 300. In this example, first axis 302 represents the maturity date for a financial instrument, and second axis 304 represents the yield of a financial instrument. (It should be noted that the values shown along second axis 304 (e.g., "1," "2," "3," etc.) represent yield as a percentage, and therefore a yield of "1" is actually a yield of "1%.") However, these examples are merely illustrative, and axes 302 and 304 may represent any suitable parameters in connection with a financial instrument. For example, instead of representing the yield of a financial instrument, second axis 304 could represent the price of a financial instrument.

As shown, graph 300 has two curves 306 and 308. In the example shown, curve 306 represents United States Agencies and curve 308 represents United States Treasuries. Thus, graph 300 shows the relationship between United States Agencies curve 306 and United States Treasuries curve 308. More generally, graph 300 shows the "spread" between United States Agencies and United States Treasuries over maturity dates (i.e., first axis 302). This spread may be of particular importance to a trader, as United States Treasuries are typically considered a "yardstick" by which to measure the value of United States Agencies. It should be noted that the present example of a spread is merely illustrative. The electronic trading system may provide other yardsticks in connection with financial instruments, such as, for example, an option adjusted spread (OAS) for callable bonds, net basis and "optionality Greeks" for deliverable bonds, weighted average life and maturity for mortgage-backed securities (MBS), forward spreads based on repo, rates for forward "structures" of synthetic borrowing or lending, etc.

Preferably, the curves shown in graph 300 are updated in real-time. In other words, the curves shown in graph 300 are updated as the graphical trading interface application keeps up with some activity (e.g., changes in the yield of a financial instrument, changes in available bids or offers for financial instruments, etc.). In one example, the graphical trading interface application may receive information in connection with some activity from a trading platform that forms a portion of the electronic trading system (e.g., eSpeed™ trading platform). In another example, the graphical trading interface application may receive information in connection with some activity from an external source, such as a different trading platform or a financial market ticker. The market ticker may include, for example, information in connection with the trading platform that forms a portion of the electronic trading system, in addition to information in connection with other trading platforms.

The user may be able to "zoom into" an area of interest on graph 300. In one example, first axis 302 may be divided into discrete portions, or "vertical columns," of a fixed width. In this example, in which first axis 302 represents the maturity date, the fixed width is a length of time, such as one year, two years, etc. When a user selects a portion of graph 300 using, for example, an input device (e.g., input device 206 of FIG. 2), the user is actually selecting a particular vertical column of a fixed width. More specifically, the point on graph 300 that the user selects is actually along a "center axis" of the vertical column. In the example shown, the user has selected a point on graph 300 that is along the center axis of column 310. Column 310 defines the span of maturity dates for United States Agency curve 306 and United States Treasury curve 308 from February 2008 to October 2010. It should be noted that, although this example is described in terms of vertical columns, "horizontal columns" could also be defined by dividing second axis 304 into discrete portions using the principles described hereinabove.

Figure 4:
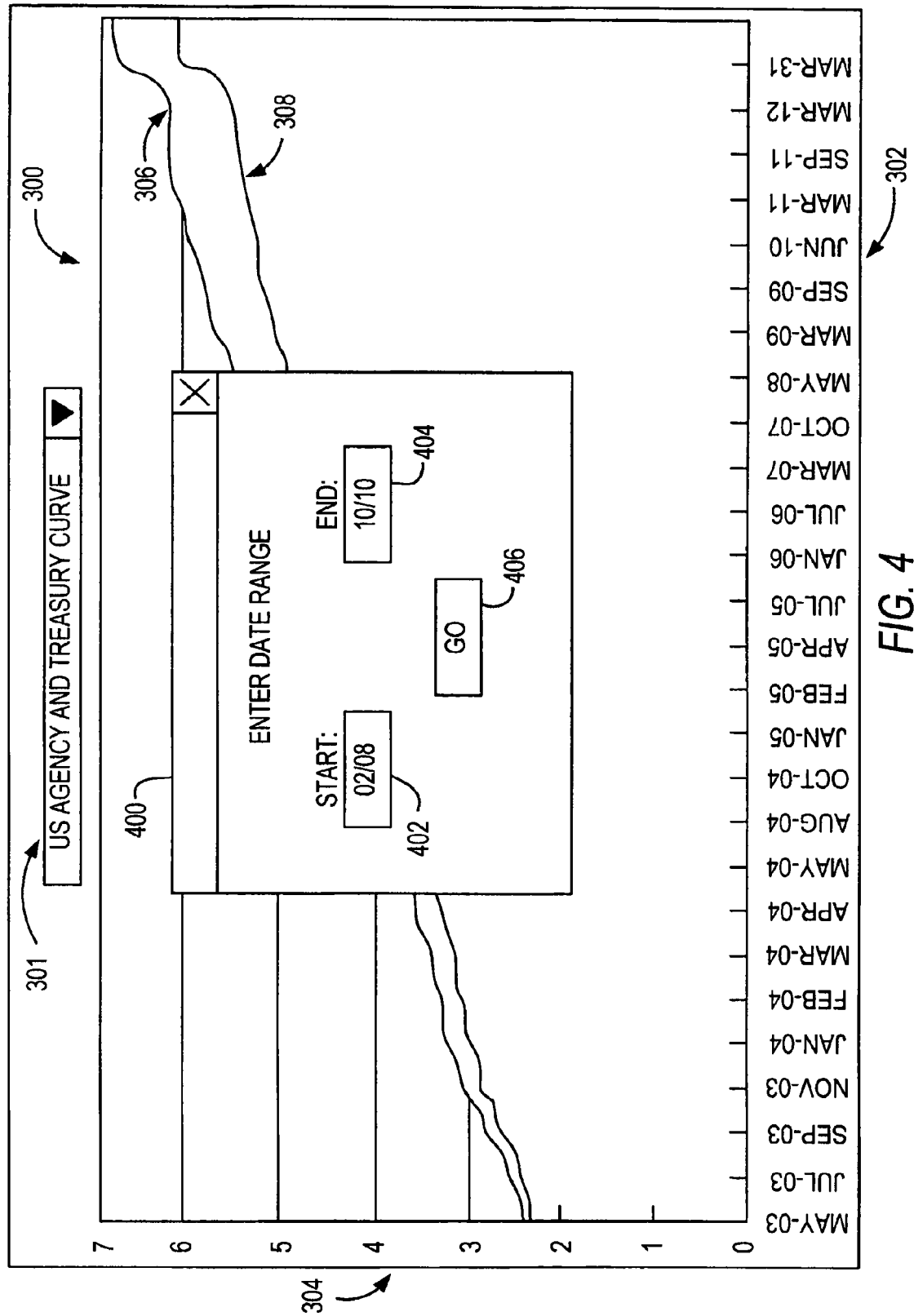
FIG. 4 is a graphical trading interface, such as the interface shown in FIG. 3, having a selectable date range overlay.

In another example, shown in FIG. 4, the user may select the desired width of first axis 302 for zooming into an area of interest in graph 300. When the user selects a portion of graph 300 using, for example, an input device (e.g., input device 206 of FIG. 2), a selectable date range overlay 400 may be displayed on graph 300. The user may enter a start date in field 402 and an end date in field 404. The user may submit the start and end dates by selecting go button 406. In the example shown, the user has entered "02/08" in start field 402 and "10/10" in end field 404. These entries correspond to a range of maturity dates for Unites States Agencies curve 306 and United States Treasuries curve 308 from February 2008 to October 2010. Although overlay 400 as shown in FIG. 4 provides a user with fields 402 and 404 corresponding to start and end dates, respectively, this example is merely illustrative. Fields 402 and 404 of overlay 400 may correspond to any suitable parameter represented by first axis 302, thereby setting a width of the first axis for zooming into graph 300. Also, as stated hereinabove in connection with FIG. 3, overlay 400 may also be used to select a width of second axis 304 for zooming into graph 300.

Figure 5:
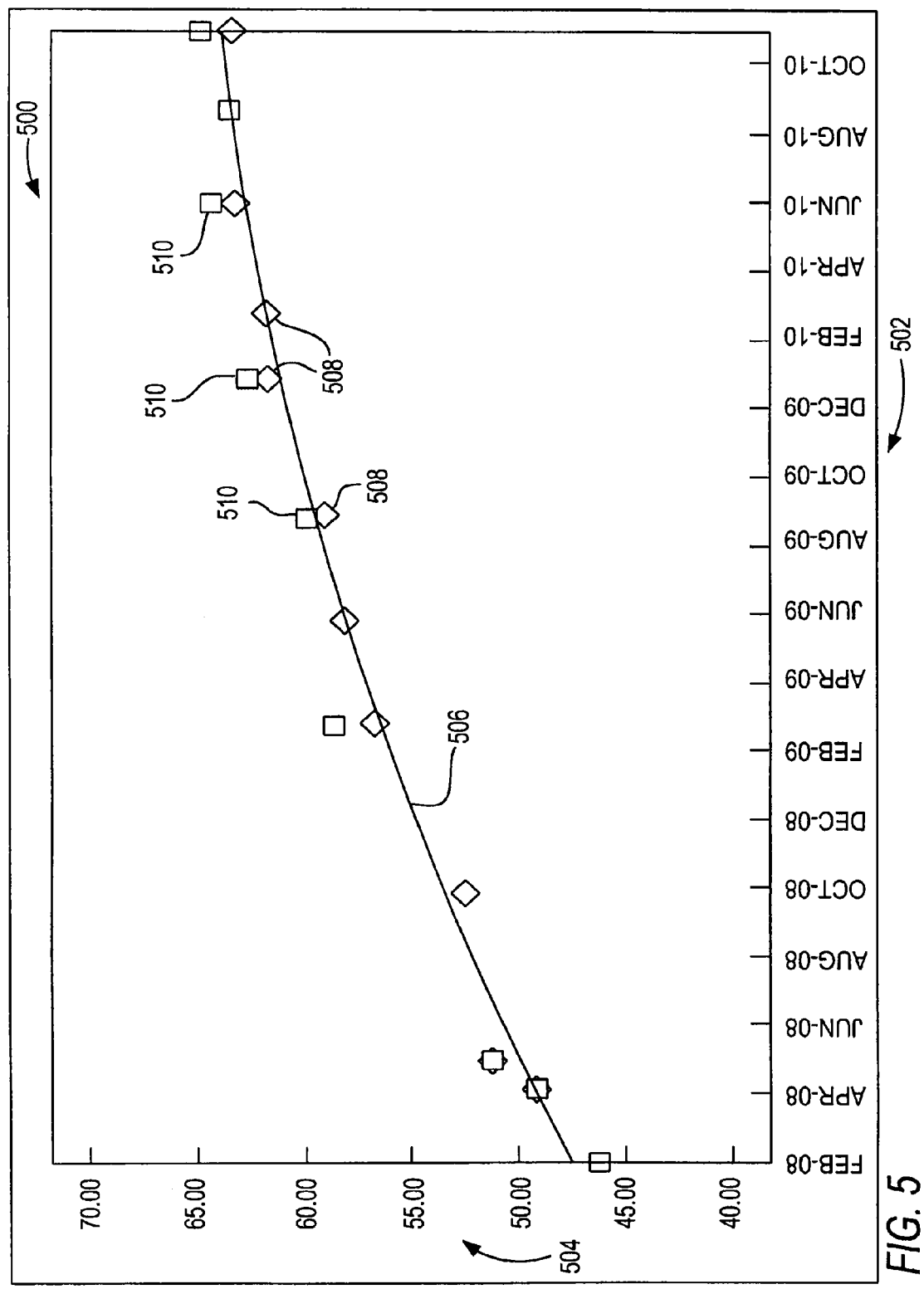
FIG. 5 is another graphical trading interface that may be provided to the user by the graphical trading interface application.

FIG. 5 shows a graphical trading interface that may be provided to a user by the graphical trading interface application. Graphical trading interface 500, or simply graph 500, may be provided, for example, in response to a user zooming into graph 300 (as described hereinabove in reference to FIGS. 3 and 4). Graph 500 shows a range of maturity dates for Unites States Agencies curve 506 from February 2008 to October 2010.

In this example, first axis 502 of graph 500 represents the maturity date for a financial instrument (as in, for example, FIG. 3), and second axis 504 represents the spread between the yields of financial instruments. For example, second axis 504 may represent the spread between the yields for curves 306 and 308 of FIG. 3. (It should be noted that the values shown along second axis 504 (e.g., "40.00," "45.00," "50.00," etc.) must be multiplied by a factor of 10−2 to relate the values shown along second axis 504 to the values shown along second axis 304 of FIG. 3.) Thus, in the example of FIG. 5, United States Treasuries curve 308 of FIG. 3 is not shown. This is because, as stated hereinabove, second axis 504 represents the spread between United States Agencies curve 306 and United States Treasuries curve 308. However, the example of FIG. 5 is merely illustrative, and United States Treasuries curve 308 (or any other suitable yardstick curve) may be provided.

Graph 500 is shown as having two axes (i.e., first axis 502 and second axis 504). However, the example of FIG. 5 is merely illustrative, and graph 500 may have any suitable number of axes (e.g., one, two, three, etc.). (An illustrative example of a graph that is a "singularity," thereby having only one axis, is described hereinbelow in reference to FIG. 8.)

Graph 500 includes first symbols 508 (i.e., diamonds) that correspond to current bids and second symbols 510 (i.e., squares) that correspond to current offers. Curve 506 may represent the "fair value" curve with respect to the current bids and offers shown in graph 500. In the example shown, each of the bids and offers corresponds to a bid or an offer for United States Agencies at a particular maturity date.

Figure 6:
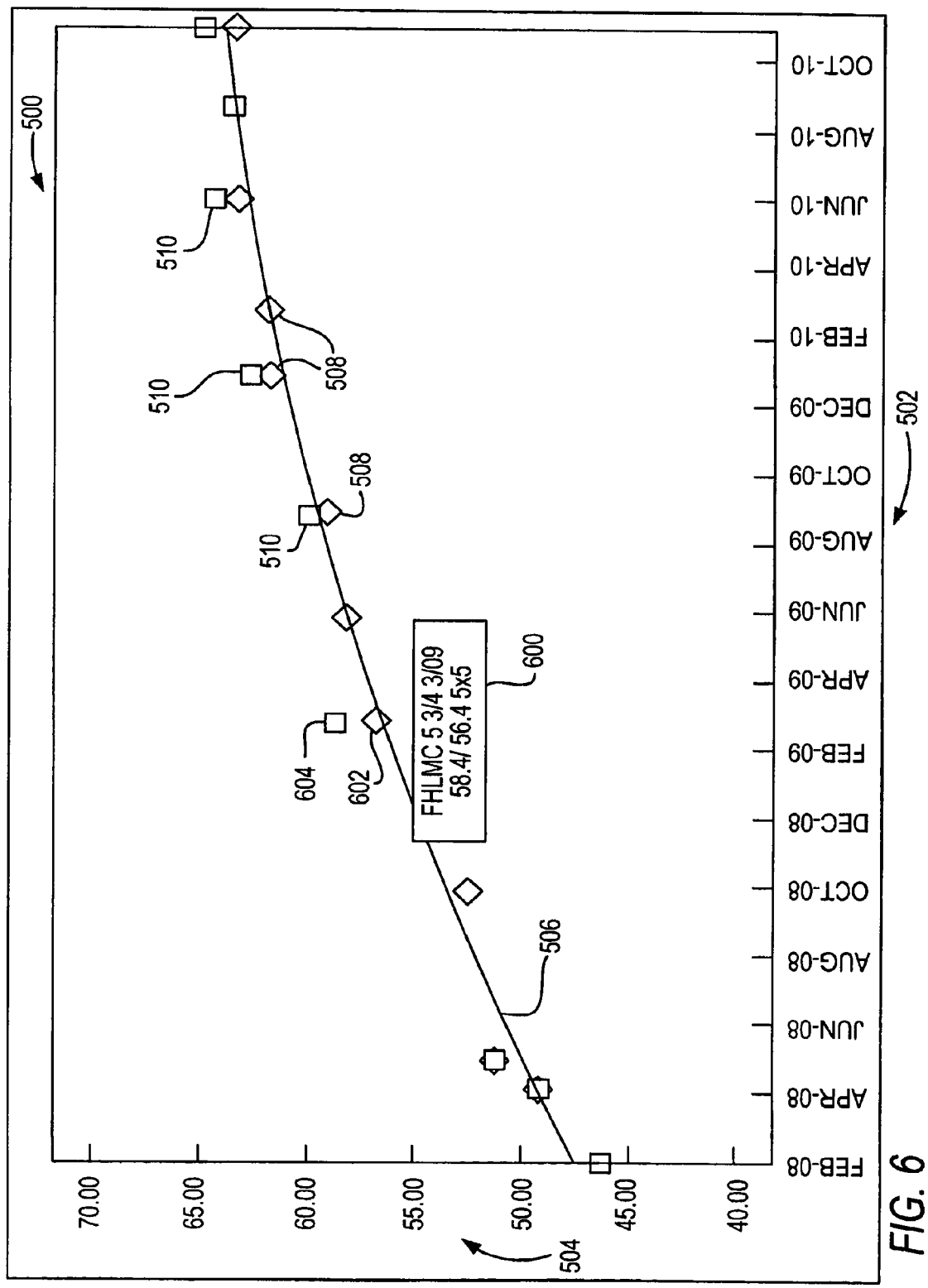
FIG. 6 is a graphical trading interface, such as the interface shown in FIG. 5, having a trading information overlay.

The user may desire to view information in connection with a specific bid and/or offer. In the example of FIG. 6, information overlay 600 is shown in connection with both a bid 602 and an offer 604 for a United States Agency having a maturity date of March 2009. Information overlay 600 may be displayed in response to an interaction by the user. For example, the user may run a cursor over top of bid 602 and/or offer 604 to view information overlay 600. Information overlay 600 shows the issue, coupon, maturity date, exact market spread, and size related to bid 602 and offer 604. In this example, the issue is "FHLMC," or Federal Home Loan Mortgage Corporation (also known as "Freddie Mac"), the coupon is "5¾," the maturity date is "3/09," or March 2009, the exact market spread is "58.4/56.4," and the size is "5×5."

Figure 7:
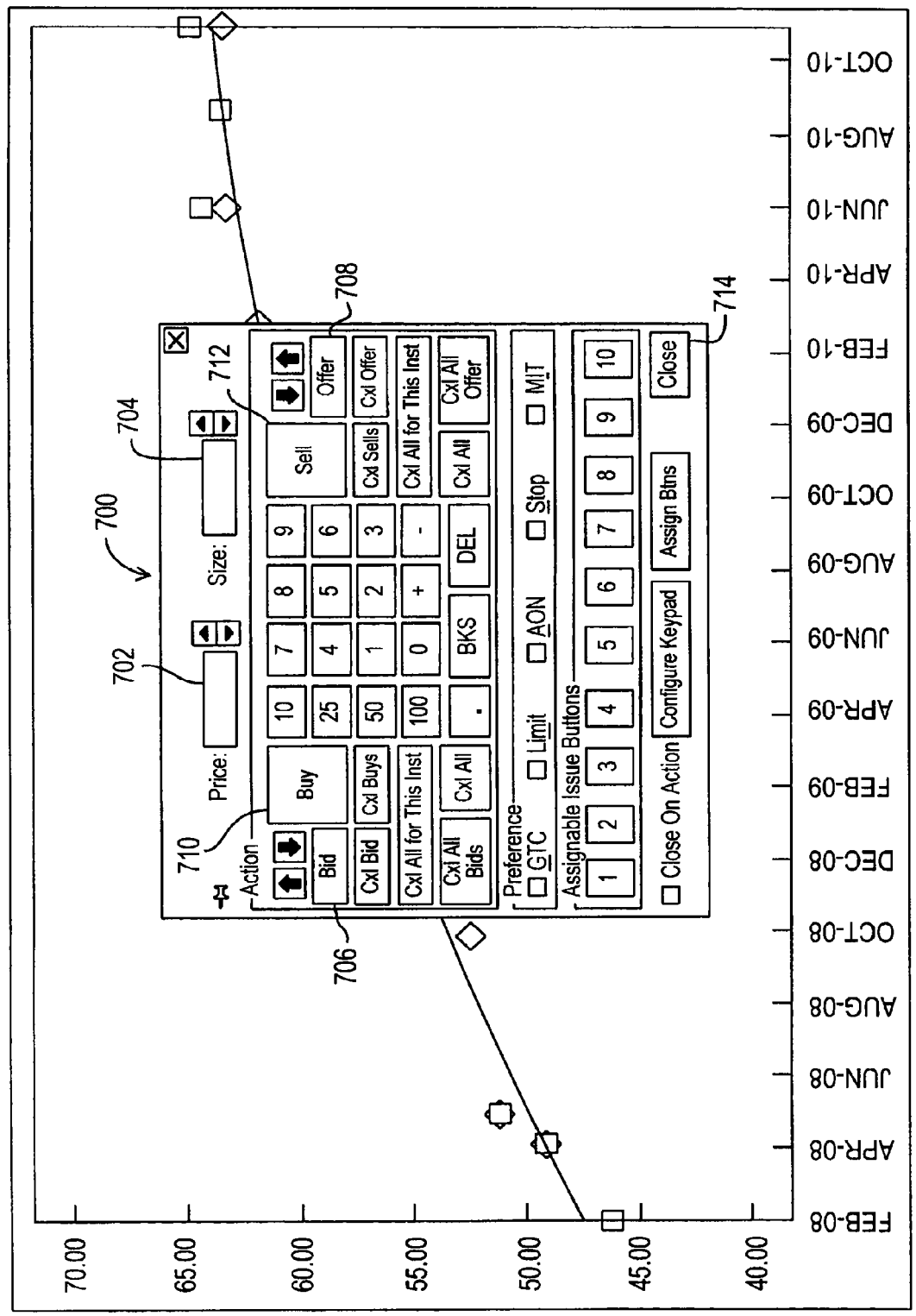
FIG. 7 is a graphical trading interface, such as the interface shown in FIG. 5, having a trading dialog box overlay.

As described hereinabove, a user may place a trade directly from a graphical trading interface. From graph 500 of FIG. 6, for example, the user may desire to place a bid or offer or to submit a hit or lift in response to a particular bid or offer. In an example in which the user desires to place a bid or offer, the user may select any portion of graph 500. In response to the user's selection, the user may be provided with trading dialog box overlay 700 as shown in FIG. 7. Trading dialog box overlay 700 may include price field 702 and size field 704, into which the user may enter a desired price and size, respectively, for a particular financial instrument. The user may then select either bid button 706 or offer button 708, depending on the desired transaction.

Referring back to FIG. 6, in an example in which the user desires to submit a hit or lift in response to a particular bid or offer, respectively, the user may select any portion of graph 500. Preferably, the user selects one of a bid 602, an offer 604, or curve 506. In response to the user's selection, the user may be provided with trading dialog box overlay 700 as shown in FIG. 7. If the user selected a bid 602, an offer 604, or curve 506, price field 702 and/or size field 704 may be pre-filled with information corresponding to the selection. If one or both of price field 702 and size field 704 are not pre-filled, or if the user desires to alter the value in one or both of the fields, the user may do so prior to selecting either buy button 710 or sell button 712 to complete the transaction. Trading dialog box overlay 700 includes close button 714 to allow the user to close the overlay and return to graph 500.

Graph 500 of FIGS. 5 and 6 is shown as having two axes (i.e., first axis 502 and second axis 504). However, this example is merely illustrative, and as mentioned hereinabove, an illustrative example of a graph that is a "singularity" is shown in FIG. 8.

Figure 8:
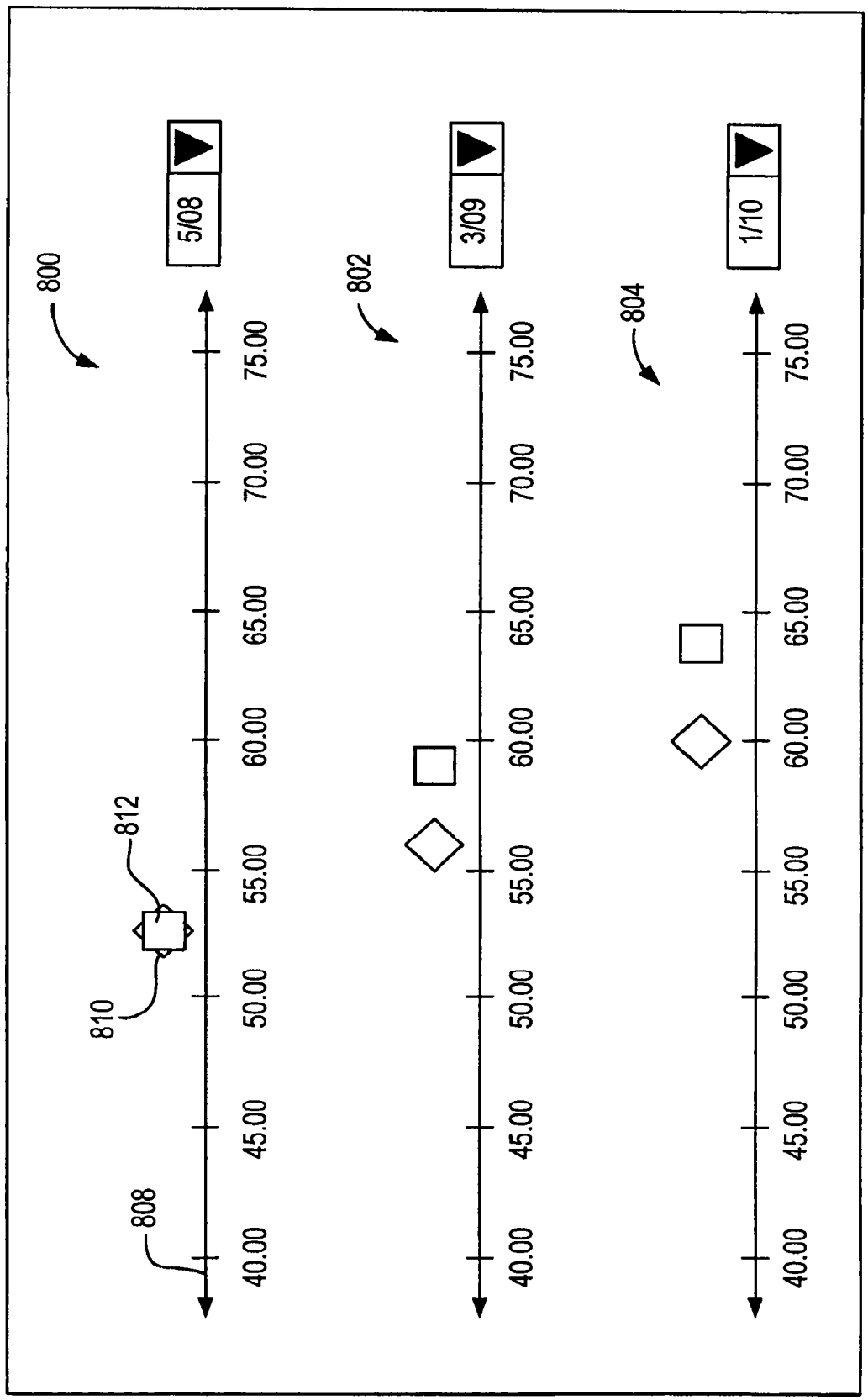
FIG. 8 is yet another graphical trading interface that may be provided to the user by the graphical trading interface application.

FIG. 8 shows various graphical trading interfaces that may be provided to a user by the graphical trading interface application. Graphical trading interfaces 800, 802, and 804, or simply graphs 800, 802, and 804, are graphs having only one axis each. Multiple graphs are shown at one time in FIG. 8 in contrast to, for example, FIG. 5, in which only one graph (i.e., graph 500) is shown. This is because graphs 800, 802, and 804 do not take up much space on a display (e.g., display 204 of workstation 102 (FIG. 2)). However, the example of FIG. 8 is merely illustrative, and any suitable number of graphs that are singularities may be displayed at one time for a user (e.g., one, two, three, etc.).

As shown in drop-down title box 806, graph 800 represents a certain parameter (i.e., axis 808) in connection with a United States Agency having a maturity date of "5/08," or May 2008. The user may be provided with a number of different graphs from which to choose. For example, the user may select drop-down title box 806 to access a list of possible graphs (not shown). Graph 800 includes axis 808, which in this example represents the spread between the yield for the United States Agency having a maturity date of May 2008 and the United States Treasury having a maturity date of May 2008. Graph 800 includes first symbol 810 (i.e., a diamond) that corresponds to a current bid and second symbol 812 (i.e., a square) that corresponds to a current offer for the United States Agency.

The information provided in graph 800 corresponds to a portion of the information provided in graph 500 (FIG. 5). For example, as shown in FIG. 5, the spread (i.e., second axis 504) for bid 508 and offer 510 for a United States Agency having a maturity date of May 2008 (i.e., first axis 502) is the same as the spread shown in graph 800 of FIG. 5, as represented by axis 808. Thus, while graph 500 (FIG. 5) shows the spread over a span of maturity dates, as represented by axes 502 and 504, graph 800 shows the spread for a particular maturity date, as represented by axis 808.

The example of FIG. 8 has been described in connection with graph 800. However, it should be noted that graphs 802 and 804 have identical features to those described in connection with graph 800 (i.e., axis, first symbol, second symbol, drop-down title box). The difference between graphs 802 and 804, obviously, is that each of graphs 802 and 804 represent the spread between the yield for a United States Agency having a particular maturity date and a United States Treasury having the same maturity date.

From any of graphs 800, 802, and 804, the user may desire to place a bid or offer or to submit a hit or lift in response to a particular bid or offer. As described hereinabove in connection with FIG. 6, the user may be provided with a trading dialog box overlay (e.g., trading dialog box overlay 700 of FIG. 7) in response to the user's interaction with any one of graphs 800, 802, and 804 (not shown). As described hereinabove, the trading dialog box may be pre-filled with information corresponding to the selection.

Figure 9:
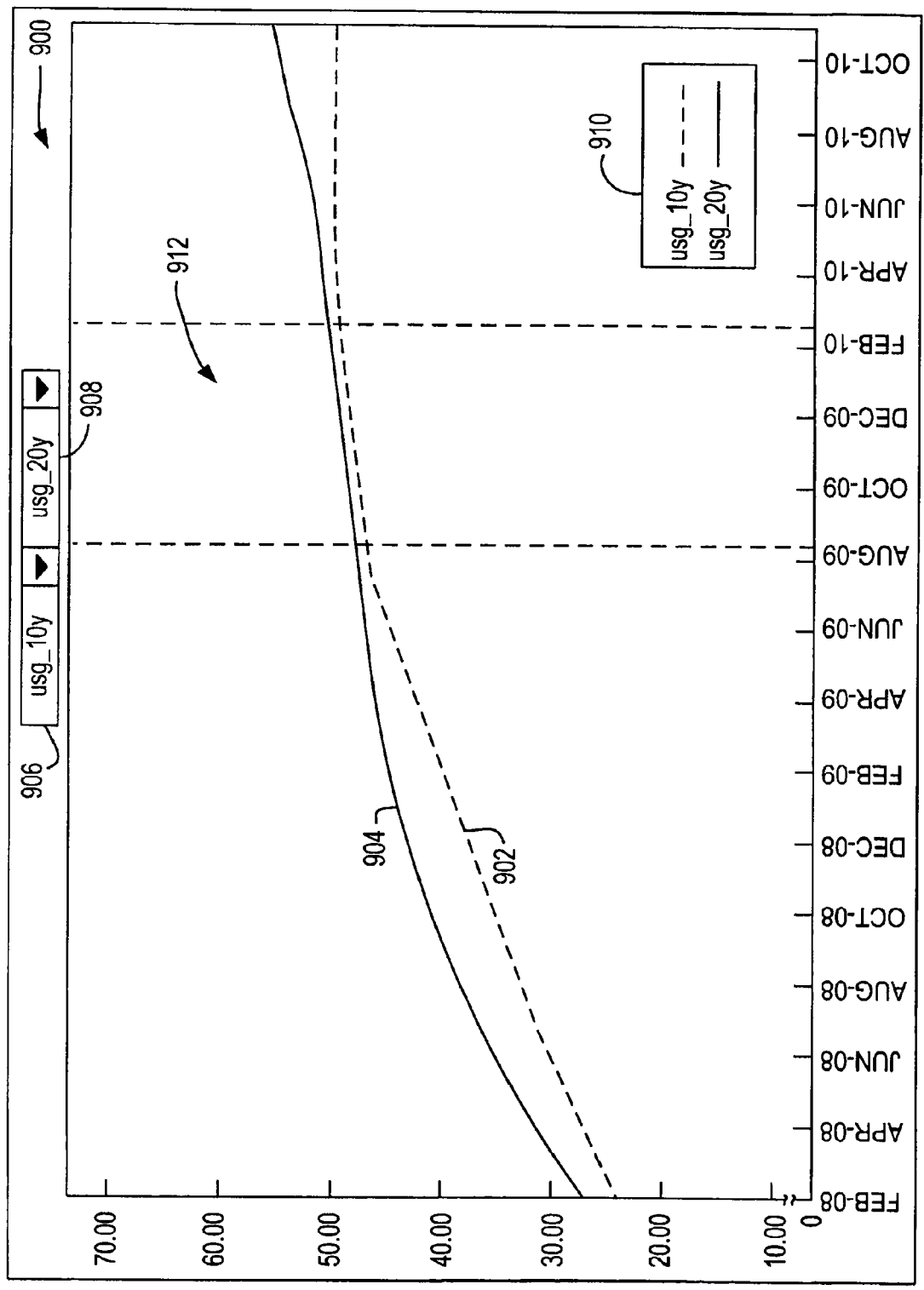
FIG. 9 is still another graphical trading interface that may be provided to the user by the graphical trading interface application.

FIG. 9 shows a graphical trading interface that may be provided to the user by the graphical trading interface application. Graphical trading interface 900, or simply graph 900, provides the user with the ability to compare curves to one another, each curve representing a range of values of a financial instrument, and to place a trade directly from the graph. In the example shown in FIG. 9, graph 900 includes a United States Treasury curve 902 for treasuries having a maturity of ten years ("usg_10y") and a United States Treasury curve 904 for treasuries having maturity of twenty years ("usg_20y"). The user may be provided with a number of different curves from which to choose. For example, the user may select a first curve (e.g., curve 902) from drop-down title box 906 and a second curve (e.g., curve 904) from drop-down title box 908. Although only two drop-down title boxes are shown, the user may be provided with any number of title boxes or other such options to display any number of curves for comparison in graph 900. Because graph 900 includes more than one curve, a legend such as legend 910 may be included in order to differentiate between different curves.

Figure 10:
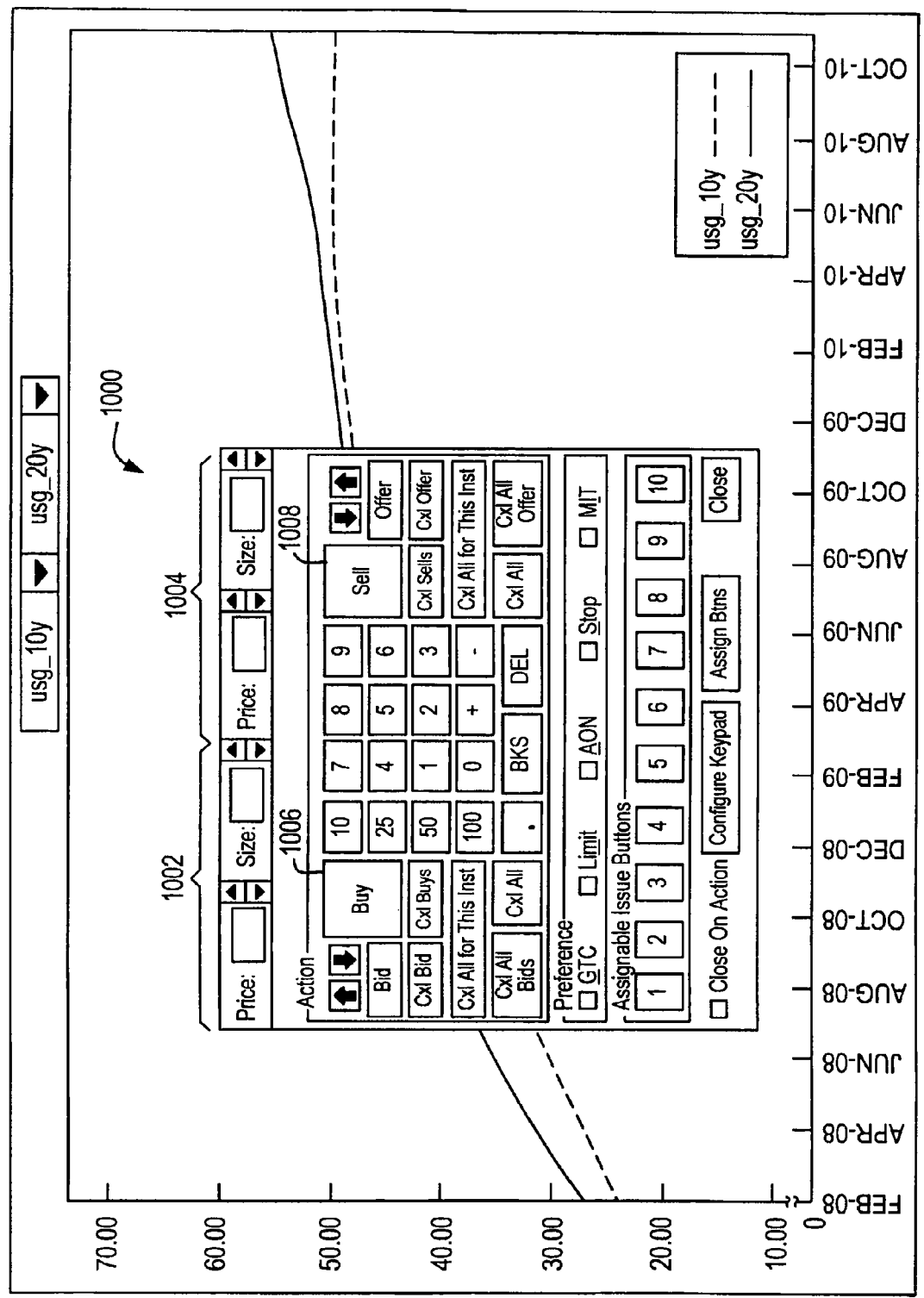
FIG. 10 is a graphical trading interface, such as the interface shown in FIG. 9, having a trading dialog box overlay.

A comparison of curves, each curve representing a range of values of a financial instrument, may provide a trader with a quick, accurate representation of a market's current position. Preferably, the curves shown in graph 900 are updated in real-time. In other words, and as described in more detail in reference to FIG. 5, the curves shown in graph 900 are updated as the graphical trading interface application keeps up with some activity (e.g., changes in the yield of a financial instrument, changes in available bids or offers for financial instruments, etc.). As shown in FIG. 9, region 912 may be of particular interest to a trader. In the example shown in the FIG., the ten-year Treasuries represented by curve 902 are valued at a price that is higher than expected, while the twenty-year Treasuries represented by curve 904 are valued at a price that is lower than expected. Thus, the trader may desire to capitalize on the anomalous situation quickly and easily. Specifically, the trader may desire to both sell ten-year Treasuries and buy twenty-year Treasuries. To do so, the trader may select region 912 of graph 900 and, in response to the selection, may be provided with trading dialog box overlay 1000 as shown in FIG. 10.

Trading dialog box overlay 1000 may allow the trader to both buy and sell in response to an anomalous situation such as that shown in FIG. 9. Trading dialog box overlay 1000 may include a buy region 1002 and a sell region 1004. Both buy and sell regions 1002 and 1004, respectively, may be pre-filled with price and size information corresponding to region 912 of graph 900 (FIG. 9). To place the trades, the user may select buy button 1006 and sell button 1008.

Figure 11:
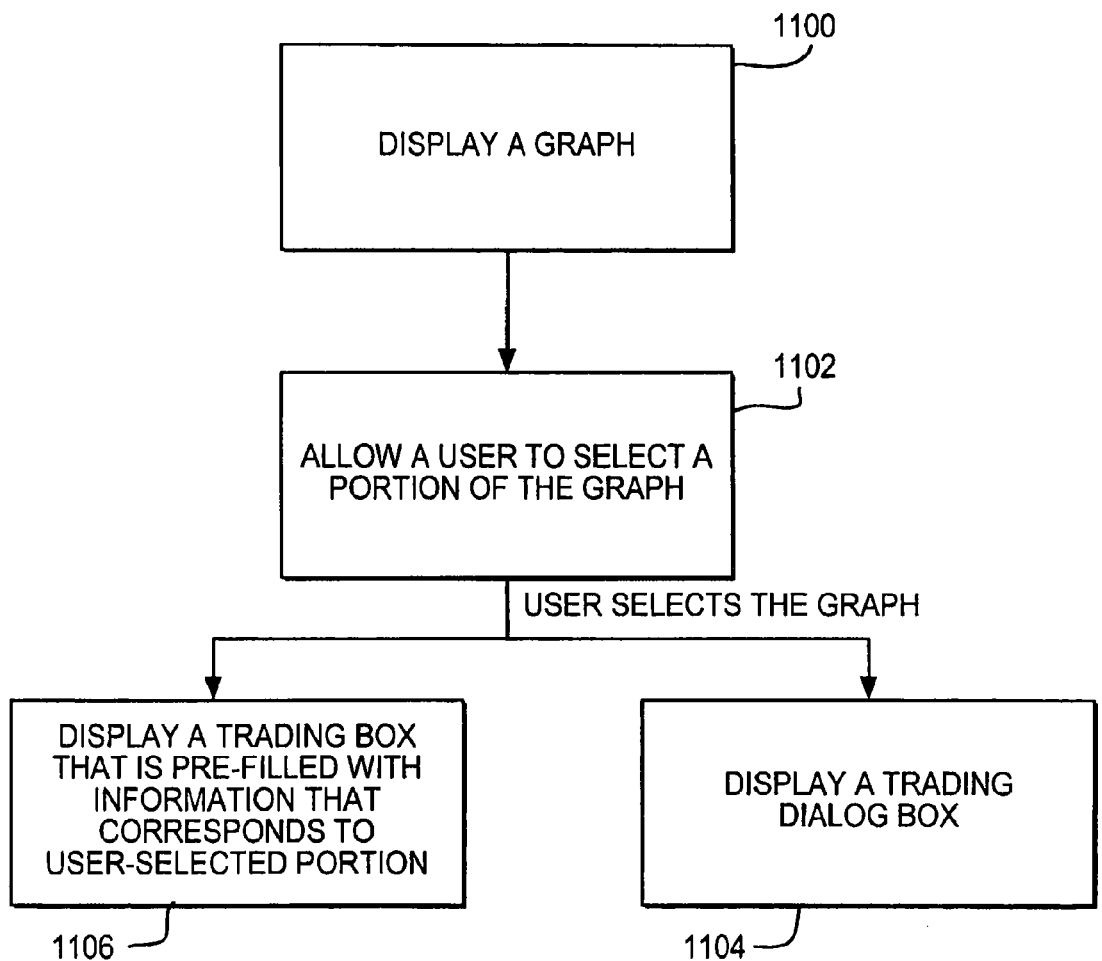
FIG. 11 is a flow chart of illustrative steps involved in providing an interactive graphical representation of a market.

FIG. 11 is a flow chart of illustrative steps involved in providing an interactive graphical representation of a market. At step 1100, a graph may be displayed. For example, a graph such as graph 300 (FIG. 3); graph 500 (FIG. 5); graph 802, 804, or 806 (FIG. 8); or graph 900 (FIG. 9) may be displayed. The graph may be displayed on a display of a workstation, such as display 204 of workstation 102 (FIG. 2). At step 1102, a user may be allowed to select a portion of the graph. In one example, in response to the user's selection of a portion of the graph, a trading dialog box may be displayed at step 1104. For example, a trading dialog box such as trading dialog box 700 (FIG. 7) or trading dialog box 1000 (FIG. 10) may be displayed. In another example, in response to the user's selection of a portion of the graph, a trading dialog box may be displayed that is pre-filled with information that corresponds to the user-selected portion of the graph (step 1106).

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. In many cases, one feature or group of features may be used separately from the entire apparatus or methods described. Many of those undescribed variations, modifications and variations are within the literal scope of the following claims, and others are equivalent.

The invention claimed is:

1. A computer-implemented method for providing an interactive graphical representation of a market, the method comprising:
generating, by at least one processor, a multidimensional graph on a display device, the graph having at least one selectable portion;
generating, by the at least one processor, a curve corresponding to a range of values of a financial instrument on the display device;
detecting, by the at least one processor, an input on a selectable portion of the graph; and
in response to the input, generating, by the at least one processor, a trading dialog box on the display device and pre-filling at least one field in the trading dialog box with information corresponding to the selectable portion of the graph.

2. The method of claim 1, wherein a first axis of the graph corresponds to a maturity date.

3. The method of claim 1, wherein a second axis of the graph corresponds to a yield.

4. The method of claim 1, wherein the curve is a fair value curve.

5. The method of claim 1, wherein the information corresponding to the selectable portion of the graph comprises price and size information.

6. An apparatus for providing an interactive graphical representation of a market, the apparatus comprising:
a display device;
at least one processor to:
generate a multidimensional graph on the display device, the graph having at least one selectable portion;
generate a curve corresponding to a range of values of a financial instrument on the display device;
detect an input on a selectable portion of the graph; and
in response to the input, generate a trading dialog box on the display device and pre-fill at least one field in the trading dialog box with information corresponding to the selectable portion of the graph.

7. The apparatus of claim 6, wherein a first axis of the graph corresponds to a maturity date.

8. The apparatus of claim 6, wherein a second axis of the graph corresponds to a yield.

9. The apparatus of claim 6, wherein the curve is a fair value curve.

10. The apparatus of claim 6, wherein at least one portion of the curve is selectable.

11. The apparatus of claim 6, wherein the information corresponding to the selectable portion of the graph comprises price and size information.

12. A computer-implemented method for providing an interactive graphical representation of a market, the method comprising:
generating, by at least one processor, a graph having a first axis and a second axis on a display of a workstation, wherein the graph includes at least one selectable portion:
generating, by the at least one processor, a plurality of first symbols, wherein each first symbol corresponds to a bid for a particular financial instrument;
generating, by the at least one processor, a plurality of second symbols, wherein each second symbol corresponds to an offer for a particular financial instrument;
detecting, by the at least one processor, an input on a selectable portion of the graph; and
in response to the input, generating, by the at least one processor, a trading dialog box on the display of the workstation.

13. The method of claim 12, wherein the first axis of the graph corresponds to a maturity date and the second axis of the graph corresponds to a yield.

14. The method of claim 12, wherein the graph includes a fair value curve.

15. The method of claim 12, wherein each first symbol is selectable.

16. The method of claim 15, wherein generating the trading dialog box in response to the input further comprises pre-filling, by the at least one processor, the trading dialog box with order information corresponding to a given first symbol, in response to detecting the input on the given first symbol.

17. The method of claim 15, wherein each second symbol is selectable.

18. The method of claim 17, wherein detecting the input on the selectable portion of the graph further comprises detecting, by the at least one processor, a selection of a given first symbol and a given second symbol.

19. The method of claim 12, wherein generating the trading dialog box in response to the input further comprises pre-filling, by the at least one processor, at least one field in the trading dialog box with information corresponding to the selectable portion of the graph.

20. A computer-implemented method comprising:
receiving from an electronic trading system, by at least one processor, market data related to a financial instrument;
generating, by at least one processor, a graph on a display of a workstation, the graph including a first axis, a second axis, and a representation of values of the financial instrument received as part of the market data;
detecting, by at least one processor, an input on a portion of the graph; and
based at least in part on detecting the input on the portion of the graph, generating, by at least one processor, a trading dialog box on the display of the workstation, and at least partially populating, by at least one processor, the trading dialog box with financial instrument information corresponding to the portion of the graph.

21. The method of claim 20, wherein the trading dialog box includes a selectable trading command for the financial instrument; the method further comprising:
detecting, by at least one processor, a selection of the trading command; and
in response to detecting the selection of the trading command, submitting, by at least one processor, the trading command to the electronic trading system.

22. The method of claim 21, wherein the trading command is at least one of placing a bid, placing an offer, hitting a bid, lifting an offer, submitting a buy command, and submitting a sell command.

23. The method of claim 20, wherein the financial instrument information includes a value of the financial instrument.

24. The method of claim 23, wherein the value of the financial instrument included in the financial instrument information corresponds to the portion of the graph.

25. The method of claim 20, further comprising generating, by at least one processor, the market data as a curve on the graph.

* * * * *